(No Model.)

T. H. McCRAY.
BELT GEARING.

No. 465,141. Patented Dec. 15, 1891.

Witnesses:
John L. Jackson
Chas. E. Piercy

Inventor:
Thomas H. McCray
By Bond, Adams & Jones
Attys.

UNITED STATES PATENT OFFICE.

THOMAS H. McCRAY, OF CHICAGO, ILLINOIS, ASSIGNOR TO LESTER L. BOND, OF SAME PLACE.

BELT-GEARING.

SPECIFICATION forming part of Letters Patent No. 465,141, dated December 15, 1891.

Application filed January 7, 1891. Serial No. 377,056. (No model.)

*To all whom it may concern:*

Be it known that I, THOMAS H. MCCRAY, residing at Chicago, in the county of Cook and State of Illinois, and a citizen of the United States, have invented a new and useful Improvement in Belt-Gearing, of which the following is a specification, reference being had to the accompanying drawings, in which—

Figure 1:
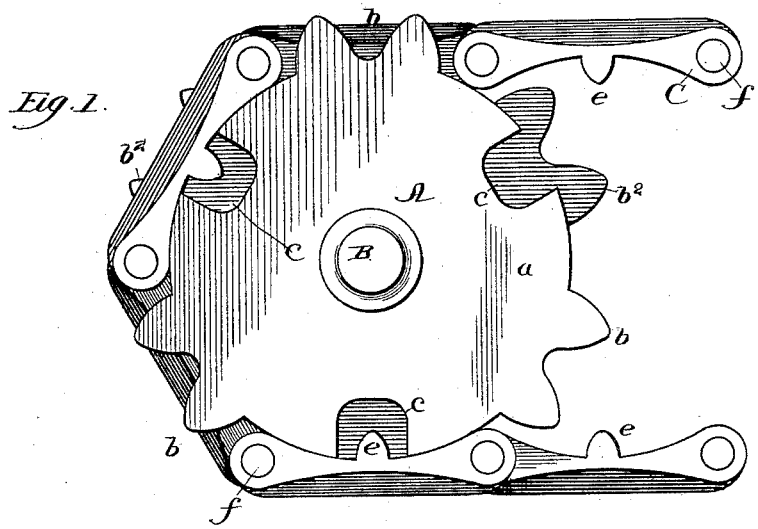
Figure 2:
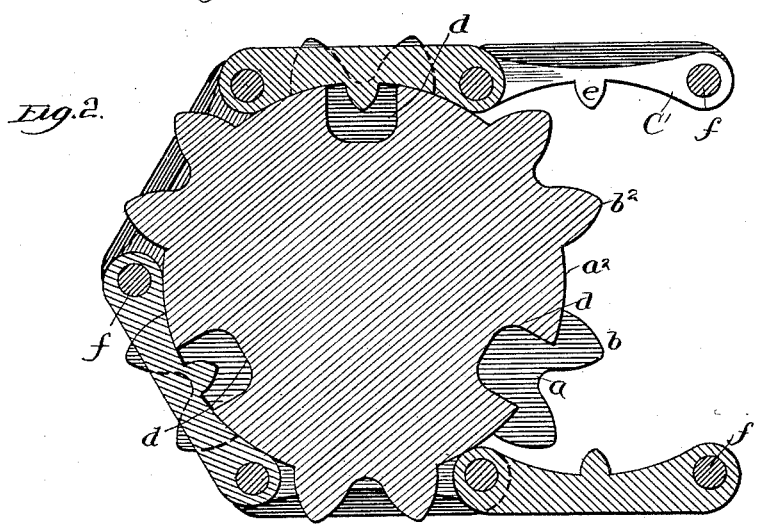
Figure 3:
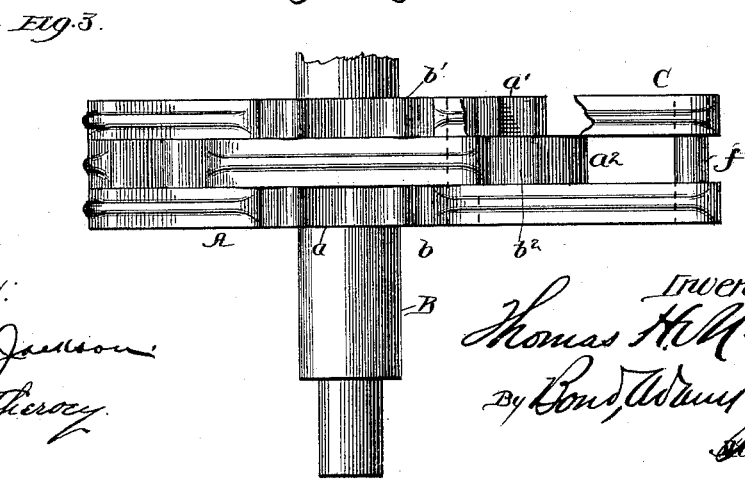

Figure 1 is a side elevation. Fig. 2 is a central vertical section, and Fig. 3 is a plan or edge view.

The object of this invention is to provide a sprocket-wheel for chains made of detachable bars or flat links, which will give the chains a bearing on two or more points, so as to avoid excessive wear upon either wheel or chain, or both, and also to give the wheel and chain a stronger connection together to prevent slipping or loss of motion. I attain these objects by the means shown in the drawings and hereinafter described.

What I deem to be new will be pointed out in the claims.

In the drawings, A indicates the sprocket-wheel, B its shaft, and C the chain.

$a, a'$, and $a^2$ indicate what may be described as three disks, but which in making are cast together as one, $a$ and $a'$ being the exterior ones, and $a^2$ the middle one; $b, b'$, and $b^2$, projections or teeth on the outer disks of the wheel; $c\ d$, notches or depressions on the inner disks; $e$, teeth or projections on the under surface of the chain-links, and $f$ connecting-pins for the chain-links.

The wheel A, with its shaft B, is usually cast in one piece, as shown; but the wheel may be provided with a central hole and the shaft B made separately and inserted therein. If it is desired to make the wheel of steel or plate metal, it may also be made in the three sections $a\ a'\ a^2$ and the sections bolted or riveted together. For ordinary purposes, however, it will be sufficient to make these parts of cast-iron as one piece. The outer sections $a\ a'$ on the wheel A are provided with projections or teeth $b\ b'$, placed opposite to each other, as shown in Fig. 3, and with notches or depressions $c$ to receive the teeth $e$ of the double bar-links of the chain, and the inner section $a^2$ is provided with depressions to receive the teeth or projections $e$ of the single bar-links of the chain. The teeth or projections $b\ b'\ b^2$, as shown, are made in pairs; but this is only for the purpose of reducing the weight, and they may be run together, as the spaces between the pairs perform no service in operation. As shown, the chain is moved slightly backward on the wheel, so that the bearing-points are out of contact; but in operation the ends of the double links bear against the projections $b\ b'$, while the ends of the single links bear against the projections $b^2$, and the teeth $e$ bear against the side of the notches $c$ and $d$, so as to give the chain two points of bearing-contact for each link when in use, and when in operation the single links pass between the projections $b\ b'$, while the projection $b^2$ passes into the space between the double links, as shown in Fig. 3, so that these projections perform the additional service of acting as guides for the chain in keeping it in place upon the wheel, so as to dispense with guide-flanges upon the sides, and I therefore am enabled to produce and use a wheel no greater in thickness than the width of the double links of the chain. By this arrangement I produce a sprocket-wheel adapted to the form of chains shown, which is simple in construction, maintains the position of the chain on the wheel, and gives it two bearing-points, which reduces the wear of the chain and relieves the strain upon the connecting-pins of the chain or the chain-joints in turning the curve necessary to rotate the wheel or to be driven by the wheel.

The chain C is more fully described in another application of even date herewith.

That which I claim as new, and desire to secure by Letters Patent, is—

1. A sprocket-wheel A, composed of the sections $a\ a'\ a^2$, having the projections $b\ b'$ $b^2$ and the peripheral notches $c$ and $d$ arranged between the projections, as described, to receive and co-operate with the projecting teeth $e$ on the under surfaces of the chain-links, substantially as specified.

2. A sprocket-wheel A, having exterior projections $b\ b'$ and notches or depressions $c$, and an interior section having projections $b^2$ and notches or depressions $d$, in combination with the chain C, composed of double and single links having projecting teeth $e$ on their under surfaces, which enter and co-operate with the notches or depressions $c\ d$, substantially as described.

THOMAS H. McCRAY.

Witnesses:
JOHN L. JACKSON,
NELLIE McKIBBEN.